United States Patent
Xia et al.

(10) Patent No.: US 7,190,744 B2
(45) Date of Patent: Mar. 13, 2007

(54) ERROR GENERATION FOR ADAPTIVE EQUALIZER

(75) Inventors: Jingsong Xia, Mundelein, IL (US); Richard W. Citta, Oak Park, IL (US); Scott M. LoPresto, Mount Prospect, IL (US); Wenjun Zhang, Shanghai (CN)

(73) Assignee: Micronas Semiconductors, Inc., Palatine, IL (US)

( * ) Notice: Subject to any disclaimer, the term of this patent is extended or adjusted under 35 U.S.C. 154(b) by 594 days.

(21) Appl. No.: 09/876,547

(22) Filed: Jun. 7, 2001

(65) Prior Publication Data

US 2002/0191716 A1 Dec. 19, 2002

(51) Int. Cl.
*H03D 1/00* (2006.01)
*H04L 27/06* (2006.01)

(52) U.S. Cl. .............. 375/341; 375/262; 375/340; 714/786; 714/794; 714/795

(58) Field of Classification Search ......... 375/341, 375/350, 349; 714/794, 795, 792
See application file for complete search history.

(56) References Cited

U.S. PATENT DOCUMENTS

| | | | |
|---|---|---|---|
| 4,567,599 A | 1/1986 | Mizoguchi | |
| 4,712,221 A | 12/1987 | Pearce et al. | |
| 4,815,103 A | 3/1989 | Cupo et al. | |
| 4,833,693 A | 5/1989 | Eyuboglu | |
| 4,856,031 A | 8/1989 | Goldstein | |
| 4,866,395 A | 9/1989 | Hostetter | |
| 4,989,090 A | 1/1991 | Campbell et al. | |
| 5,052,000 A | 9/1991 | Wang et al. | |
| 5,056,117 A | 10/1991 | Gitlin et al. | 375/102 |
| 5,058,047 A | 10/1991 | Chung | |
| 5,127,051 A | 6/1992 | Chan et al. | |
| 5,134,480 A | 7/1992 | Wang et al. | |
| 5,142,551 A | 8/1992 | Borth et al. | |
| 5,210,774 A | 5/1993 | Abbiate et al. | |
| 5,278,780 A | 1/1994 | Eguchi | |
| 5,311,546 A | 5/1994 | Paik et al. | |
| 5,453,797 A | 9/1995 | Nicolas et al. | |

(Continued)

FOREIGN PATENT DOCUMENTS

EP 0524559 B1 5/1997

(Continued)

OTHER PUBLICATIONS

Demodulation of Cochannel QAM Signals (continued); Error Detection/Correction; pp. 1 through 3; http://www.appsig.com/papers/1813f/813f_5.html.

(Continued)

*Primary Examiner*—Stephen Chin
*Assistant Examiner*—Erin M. File
(74) *Attorney, Agent, or Firm*—O'Shea, Getz & Kosakowski, P.C.

(57) ABSTRACT

An equalizer comprises: an FIR; a trellis decoder coupled to the FIR; a mapper coupled to the trellis decoder; and a decision feedback equalizer coupled to the mapper. The decision feedback equalizer receives the mapped and scaled output of the trellis decoder as input and an error signal is generated by subtracting an output of the decision feedback equalizer from the input to the trellis decoder.

18 Claims, 9 Drawing Sheets

U.S. PATENT DOCUMENTS

| | | | |
|---|---|---|---|
| 5,471,508 A | 11/1995 | Koslov | |
| 5,506,636 A | 4/1996 | Patel et al. | |
| 5,508,752 A | 4/1996 | Kim et al. | |
| 5,532,750 A | 7/1996 | De Haan et al. | |
| 5,537,435 A | 7/1996 | Carney et al. | |
| 5,568,098 A | 10/1996 | Horie et al. | |
| 5,568,521 A | 10/1996 | Williams et al. | |
| 5,588,025 A | 12/1996 | Strolle et al. | 375/316 |
| 5,619,154 A | 4/1997 | Strolle et al. | |
| 5,648,987 A | 7/1997 | Yang et al. | |
| 5,668,831 A | 9/1997 | Claydon et al. | |
| 5,692,014 A | 11/1997 | Basham et al. | |
| 5,757,855 A | 5/1998 | Strolle et al. | 375/262 |
| 5,781,460 A | 7/1998 | Nguyen et al. | |
| 5,789,988 A | 8/1998 | Sasaki | |
| 5,802,461 A | 9/1998 | Gatherer | |
| 5,805,242 A | 9/1998 | Strolle et al. | |
| 5,828,705 A | 10/1998 | Kroeger et al. | |
| 5,835,532 A | 11/1998 | Strolle et al. | |
| 5,862,156 A | 1/1999 | Huszar et al. | |
| 5,870,433 A | 2/1999 | Huber et al. | |
| 5,872,817 A | 2/1999 | Wei | |
| 5,877,816 A | 3/1999 | Kim | |
| 5,894,334 A | 4/1999 | Strolle et al. | |
| 5,995,154 A | 11/1999 | Heimburger | |
| 6,005,640 A | 12/1999 | Strolle et al. | |
| 6,012,421 A | 1/2000 | Kusche et al. | |
| 6,034,734 A | 3/2000 | De Haan et al. | |
| 6,034,998 A | 3/2000 | Takashi et al. | |
| 6,044,083 A | 3/2000 | Citta et al. | |
| 6,069,524 A | 5/2000 | Mycynek et al. | |
| 6,133,785 A | 10/2000 | Bourdeau | |
| 6,133,964 A | 10/2000 | Han | |
| 6,141,384 A | 10/2000 | Wittig et al. | |
| 6,145,114 A | 11/2000 | Crozier et al. | |
| 6,154,487 A | 11/2000 | Murai et al. | |
| 6,178,209 B1 | 1/2001 | Hulyalkar et al. | 375/341 |
| 6,195,400 B1 | 2/2001 | Maeda | |
| 6,198,777 B1 | 3/2001 | Feher | |
| 6,219,379 B1 | 4/2001 | Ghosh | |
| 6,222,891 B1 | 4/2001 | Liu et al. | |
| 6,226,323 B1 | 5/2001 | Tan et al. | |
| 6,233,286 B1 | 5/2001 | Wei | |
| 6,240,133 B1 | 5/2001 | Sommer et al. | |
| 6,249,544 B1 | 6/2001 | Azazzi et al. | |
| 6,260,053 B1 | 7/2001 | Maulik et al. | |
| 6,272,173 B1 | 8/2001 | Hatamian | |
| 6,275,554 B1 | 8/2001 | Bouillet et al. | |
| 6,278,736 B1 | 8/2001 | De Haan et al. | |
| 6,304,614 B1 | 10/2001 | Abbaszadeh et al. | |
| 6,307,901 B1 | 10/2001 | Yu et al. | |
| 6,333,767 B1 | 12/2001 | Patel et al. | |
| 6,356,586 B1 | 3/2002 | Krishnamoorthy et al. | |
| 6,363,124 B1 | 3/2002 | Cochran | |
| 6,411,341 B1 | 6/2002 | De Haan et al. | |
| 6,411,659 B1 | 6/2002 | Liu et al. | |
| 6,415,002 B1 | 7/2002 | Edwards et al. | |
| 6,421,378 B1 | 7/2002 | Fukuoka et al. | |
| 6,438,164 B2 | 8/2002 | Tan et al. | |
| 6,452,639 B1 | 9/2002 | Wagner et al. | |
| 6,466,630 B1 | 10/2002 | Jensen | |
| 6,483,872 B2 | 11/2002 | Nguyen | |
| 6,490,007 B1 | 12/2002 | Bouillet et al. | |
| 6,493,409 B1 | 12/2002 | Lin et al. | |
| 6,507,626 B1 | 1/2003 | Limberg | |
| 6,535,553 B1 | 3/2003 | Limberg et al. | |
| 6,570,919 B1 | 5/2003 | Lee | |
| 6,573,948 B1 | 6/2003 | Limberg | |
| 6,611,555 B2 * | 8/2003 | Smith et al. | 375/222 |
| 6,665,695 B1 | 12/2003 | Brokish et al. | |
| 6,724,844 B1 | 4/2004 | Ghosh | |
| 6,734,920 B2 | 5/2004 | Ghosh et al. | |
| 6,829,297 B2 * | 12/2004 | Xia et al. | 375/232 |
| 2001/0048723 A1 | 12/2001 | Oh | |
| 2002/0024996 A1 | 2/2002 | Agazzi et al. | |
| 2002/0051498 A1 | 5/2002 | Thomas et al. | |
| 2002/0136329 A1 | 9/2002 | Liu et al. | |
| 2002/0154248 A1 | 10/2002 | Wittig et al. | |
| 2002/0172275 A1 * | 11/2002 | Birru | 375/233 |
| 2002/0172276 A1 | 11/2002 | Tan et al. | |
| 2002/0186762 A1 | 12/2002 | Xia et al. | |
| 2002/0191716 A1 | 12/2002 | Xia et al. | |
| 2003/0206600 A1 | 11/2003 | Vankka | |
| 2004/0057538 A1 | 3/2004 | Sathiavageeswaran et al. | |

FOREIGN PATENT DOCUMENTS

| | | |
|---|---|---|
| EP | 0752185 B1 | 7/2002 |
| WO | WO 00/27033 | 5/2000 |
| WO | WO 00/27066 | 5/2000 |
| WO | WO 01/01650 A1 | 1/2001 |
| WO | WO 01/13516 A2 | 2/2001 |
| WO | WO 01/43310 A2 | 6/2001 |
| WO | WO 01/43384 A2 | 6/2001 |

OTHER PUBLICATIONS

Demodulation of Cochannel QAM Signals (continued); Simulation Results; pp. 1 through 6; http://www.appsig.com/papers/1813f/813f_5.html.

De Haan et al. "DeInterlacing-an Overview", Proceedings of the IEEE, vol. 86, No. 9, pp. 1837-1856 (Sep. 1998).

De Haan et al. "De-Interlacing of Video Data", IEEE Transactions on Consumer Electronics, vol. 43, No. 3, pp. 819-824 (Aug. 1997).

Wang et al. "Time-Recursive DeInterlacing for IDTV and Pyramid Coding", Elsevier Science Publishers B. V., vol. 2, No. 3, pp. 365-374 (Oct. 1990).

* cited by examiner

ERROR GENERATION FOR ADAPTIVE EQUALIZER

BACKGROUND

Equalizers are an important element in many diverse digital information applications, such as voice, data, and video communications. These applications employ a variety of transmission media. Although the various media have differing transmission characteristics, none of them is perfect. That is, every medium induces variation into the transmitted signal, such as frequency-dependent phase and amplitude distortion, multi-path reception, other kinds of ghosting, such as voice echoes, and Rayleigh fading. In addition to channel distortion, virtually every sort of transmission also suffers from noise, such as additive white gausian noise ("AWGN"). Equalizers are therefore used as acoustic echo cancelers (for example in full-duplex speakerphones), video deghosters (for example in digital television or digital cable transmissions), signal conditioners for wireless modems and telephony, and other such applications.

One important source of error is intersymbol interference ("ISI"). ISI occurs when pulsed information, such as an amplitude modulated digital transmission, is transmitted over an analog channel, such as, for example, a phone line or an aerial broadcast. The original signal begins as a reasonable approximation of a discrete time sequence, but the received signal is a continuous time signal. The shape of the impulse train is smeared or spread by the transmission into a differentiable signal whose peaks relate to the amplitudes of the original pulses. This signal is read by digital hardware, which periodically samples the received signal.

Each pulse produces a signal that typically approximates a sinc wave. Those skilled in the art will appreciate that a sinc wave is characterized by a series of peaks centered about a central peak, with the amplitude of the peaks monotonically decreasing as the distance from the central peak increases. Similarly, the sinc wave has a series of troughs having a monotonically decreasing amplitude with increasing distance from the central peak. Typically, the period of these peaks is on the order of the sampling rate of the receiving hardware. Therefore, the amplitude at one sampling point in the signal is affected not only by the amplitude of a pulse corresponding to that point in the transmitted signal, but by contributions from pulses corresponding to other bits in the transmission stream. In other words, the portion of a signal created to correspond to one symbol in the transmission stream tends to make unwanted contributions to the portion of the received signal corresponding to other symbols in the transmission stream.

This effect can theoretically be eliminated by proper shaping of the pulses, for example by generating pulses that have zero values at regular intervals corresponding to the sampling rate. However, this pulse shaping will be defeated by the channel distortion, which will smear or spread the pulses during transmission. Consequently, another error control technique is necessary. Most digital applications therefore employ equalization in order to filter out ISI and channel distortion.

Generally, two types of equalization are employed to achieve this goal: automatic synthesis and adaptation. In automatic synthesis methods, the equalizer typically compares a received time-domain reference signal to a stored copy of the undistorted training signal. By comparing the two, a time-domain error signal is determined that may be used to calculate the coefficient of an inverse function (filter). The formulation of this inverse function may be accomplished strictly in the time domain, as is done in Zero Forcing Equalization ("ZFE") and Least Mean Square ("LMS") systems. Other methods involve conversion of the received training signal to a spectral representation. A spectral inverse response can then be calculated to compensate for the channel distortion. This inverse spectrum is then converted back to a time-domain representation so that filter tap weights can be extracted.

In adaptive equalization the equalizer attempts to minimize an error signal based on the difference between the output of the equalizer and the estimate of the transmitted signal, which is generated by a "decision device." In other words, the equalizer filter outputs a sample, and the decision device determines what value was most likely transmitted. The adaptation logic attempts to keep the difference between the two small. The main idea is that the receiver takes advantage of the knowledge of the discrete levels possible in the transmitted pulses. When the decision device quantizes the equalizer output, it is essentially discarding received noise. A crucial distinction between adaptive and automatic synthesis equalization is that adaptive equalization does not require a training signal.

Error control coding generally falls into one of two major categories: convolutional coding and block coding (such as Reed-Solomon and Golay coding). At least one purpose of equalization is to permit the generation of a mathematical "filter" that is the inverse function of the channel distortion, so that the received signal can be converted back to something more closely approximating the transmitted signal. By encoding the data into additional symbols, additional information can be included in the transmitted signal that the decoder can use to improve the accuracy of the interpretation of the received signal. Of course, this additional accuracy is achieved either at the cost of the additional bandwidth necessary to transmit the additional characters, or of the additional energy necessary to transmit at a higher frequency.

A convolutional encoder comprises a K-stage shift register into which data is clocked. The value K is called the "constraint length" of the code. The shift register is tapped at various points according to the code polynomials chosen. Several tap sets are chosen according to the code rate. The code rate is expressed as a fraction. For example, a ½ rate convolutional encoder produces an output having exactly twice as many symbols as the input. Typically, the set of tapped data is summed modulo-2 (i.e., the XOR operation is applied) to create one of the encoded output symbols. For example, a simple K=3, ½ rate convolutional encoder might form one bit of the output by modulo-2-summing the first and third bits in the 3-stage shift register, and form another bit by modulo-2-summing all three bits.

A convolutional decoder typically works by generating hypotheses about the originally transmitted data, running those hypotheses through a copy of the appropriate convolutional encoder, and comparing the encoded results with the encoded signal (including noise) that was received. The decoder generates a "metric" for each hypothesis it considers. The "metric" is a numerical value corresponding to the degree of confidence the decoder has in the corresponding hypothesis. A decoder can be either serial or parallel—that is, it can pursue either one hypothesis at a time, or several.

One important advantage of convolutional encoding over block encoding is that convolutional decoders can easily use "soft decision" information. "Soft decision" information essentially means producing output that retains information about the metrics, rather than simply selecting one hypothesis as the "correct" answer. For an overly-simplistic example, if a single symbol is determined by the decoder to have an 80% likelihood of having been a "1" in the transmission signal, and only a 20% chance of having been a "0", a "hard decision" would simply return a value of 1 for that symbol. However, a "soft decision" would return a value of 0.8, or perhaps some other value corresponding to that distribution of probabilities, in order to permit other hardware downstream to make further decisions based on that degree of confidence.

Block coding, on the other hand, has a greater ability to handle larger data blocks, and a greater ability to handle burst errors.

Figure 1:
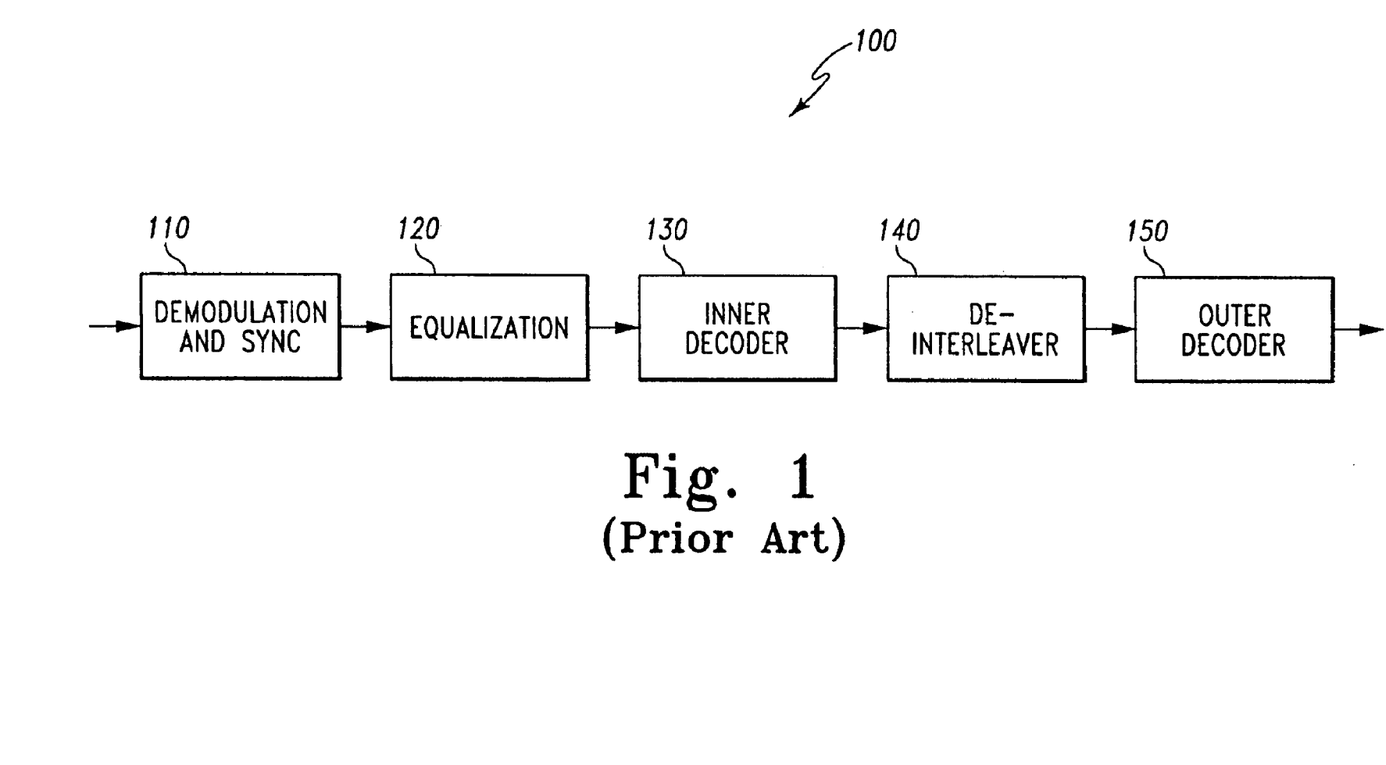
FIG. 1 is a block diagram of a prior art digital receiver.

FIG. 1 illustrates a block diagram of a typical digital communication receiver, including channel coding and equalization, indicated generally at 100. The receiver 100 comprises a demodulation and sync component 110, which converts the received analog signal back into a digital format. The receiver 100 further comprises an equalizer 120, an inner decoder 130, a de-interleaver 140, and an outer decoder 150. The inner coding is typically convolutional coding, while the outer coding is typically block coding, most often Reed-Solomon coding. The convolutional and block coding are generally combined in order to exploit the complementary advantages of each.

Figure 2:
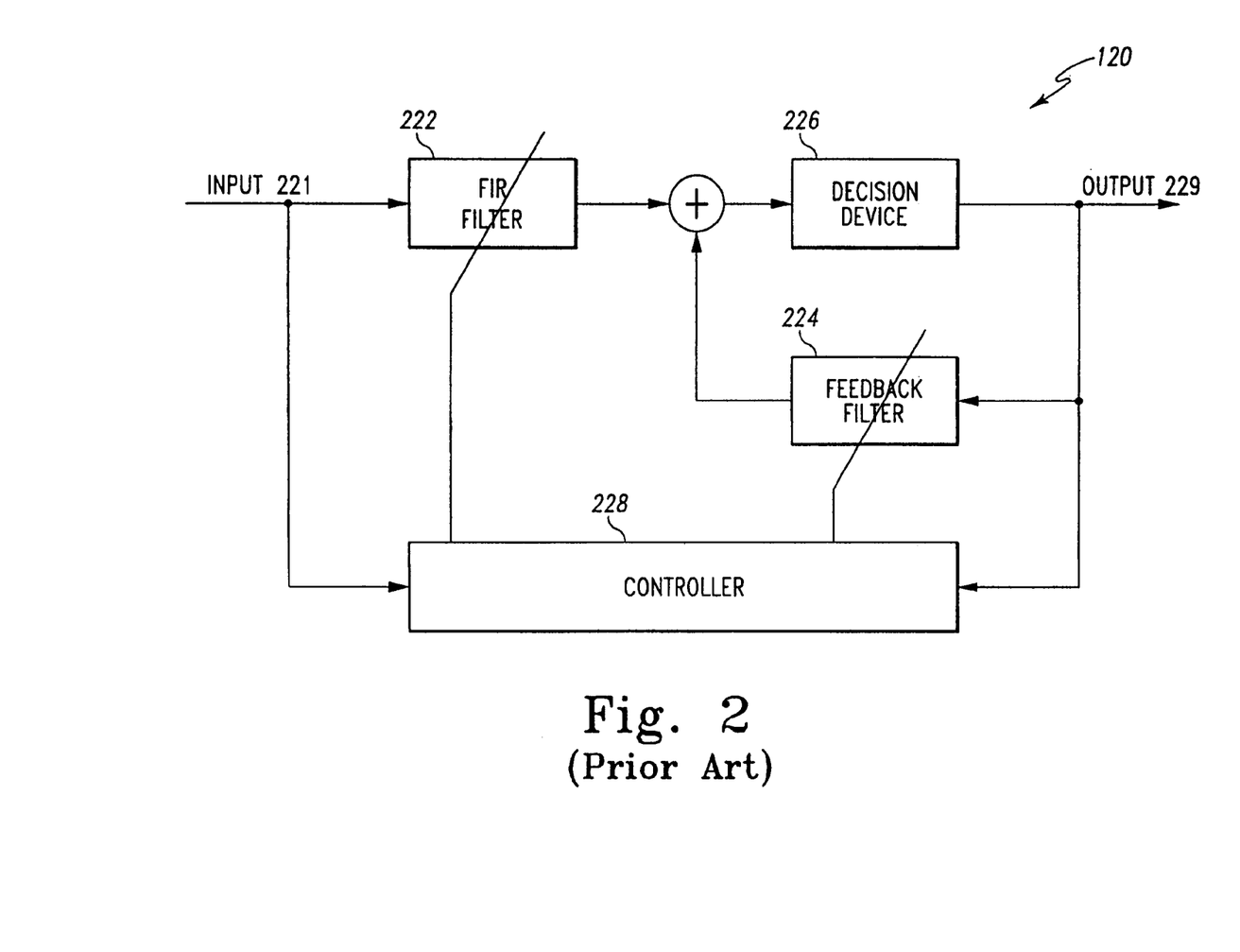
FIG. 2 is a block diagram illustration of a prior art equalizer suitable for use in the digital receiver of FIG. 1.

FIG. 2 is a diagram of an equalizer 120 such as is commonly used in the digital receiver 100 shown in FIG. 1. Typically, the equalizer 120 includes a controller 228, a finite impulse response ("FIR") filter 222, a decision device 226, and a decision feedback equalizer ("DFE") 224. The FIR filter 222 receives the input signal 221. The FIR filter 222 is used to cancel pre-ghosts—that is, ghost signals that arrive before the main transmission signal. The decision device 226 examines its inputs and makes a decision as to which one of the received signals at its input is the signal to be transmitted to the output 229. The input to the decision device 226 is modified by a decision feedback equalizer 224, which is used to cancel post-ghosts—that is, ghost signals that arrive after the main transmission signal—and the residual signal generated from the FIR filter.

The decision device 226 is typically a hard decision device, such as a slicer. For example, in an 8VSB system, the slicer can be a decision device based upon the received signal magnitude, with decision values of 0, ±2, ±4, and ±6, in order to sort the input into symbols corresponding to the normalized signal values of ±1, ±3, ±5, and ±7. For another example, the slicer can be multi-dimensional, such as those used in quadrature amplitude modulation ("QAM") systems.

The controller 228 receives the input data and the output data and generates filter coefficients for both the FIR filter 222 and the decision feedback filter 224. Those skilled in the art will appreciate that there are numerous methods suitable for generating these coefficients, including LMS and RLS algorithms.

Figure 3:
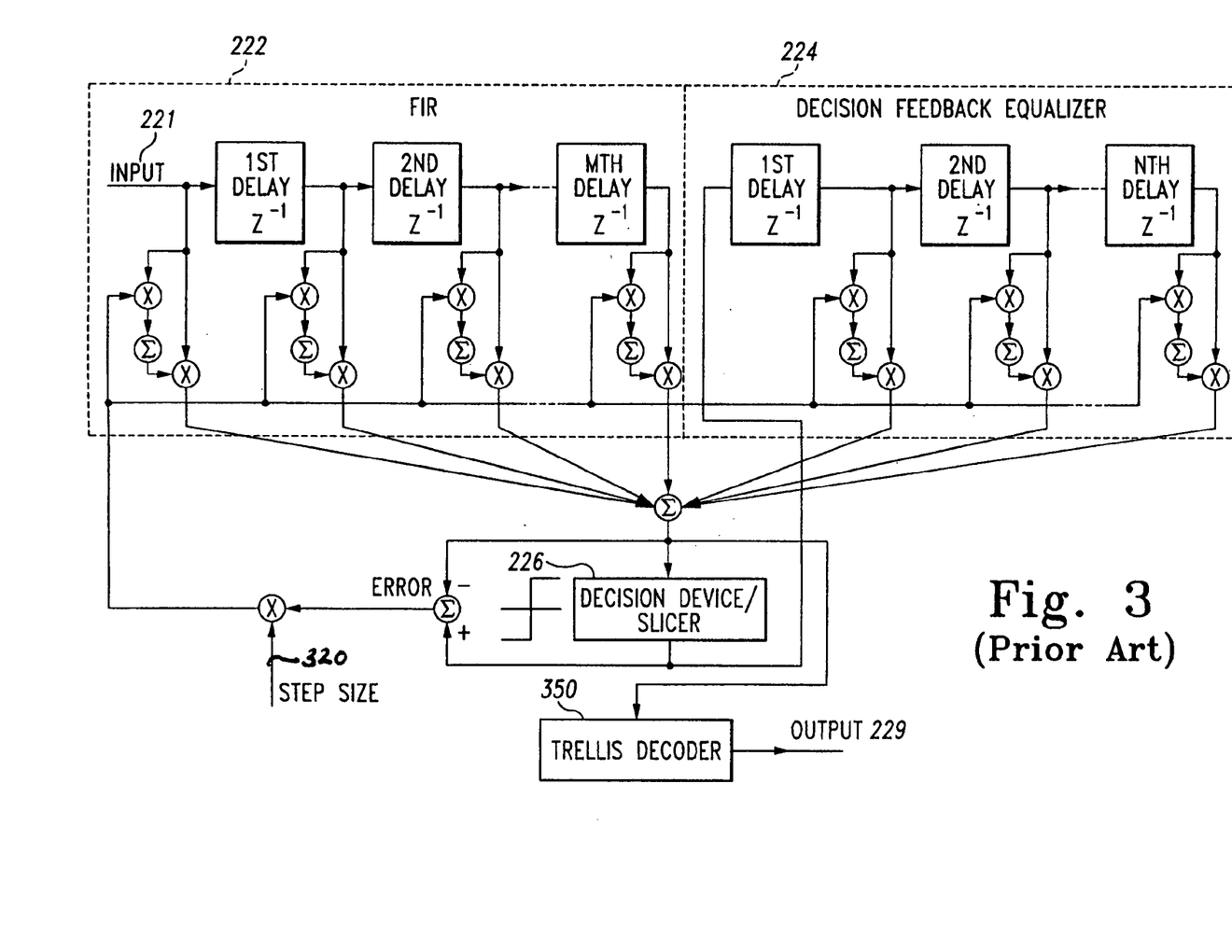
FIG. 3 is a block diagram showing further details of the prior art decision feedback equalizer in FIG. 2.

FIG. 3 illustrates further details of the equalizer 120 shown in FIG. 2. The input to the decision feedback equalizer 224 is output from the decision device 226, such as a slicer. The sliced data is delayed (F+M) stages, where F equals the number of stages in the FIR filter 222 and M equals the number of stages in the decision feedback equalizer 224. The equalizer 120 then passes the equalized data to a trellis decoder 350. An error signal 310 is generated by subtracting the input to the slicer 226 from its output. The error signal 310 is multiplied by a step size 320 before it is used to update the tap coefficients. Typically, the step size 320 is less than one, in order to permit the error signal to iteratively adjust the tap coefficients over multiple cycles, so that variations in channel response and noise are averaged out. Generally, the smaller the step size, the more severe the transient conditions under which the equalizer 120 can converge, though at the cost of slower convergence.

Figure 4:
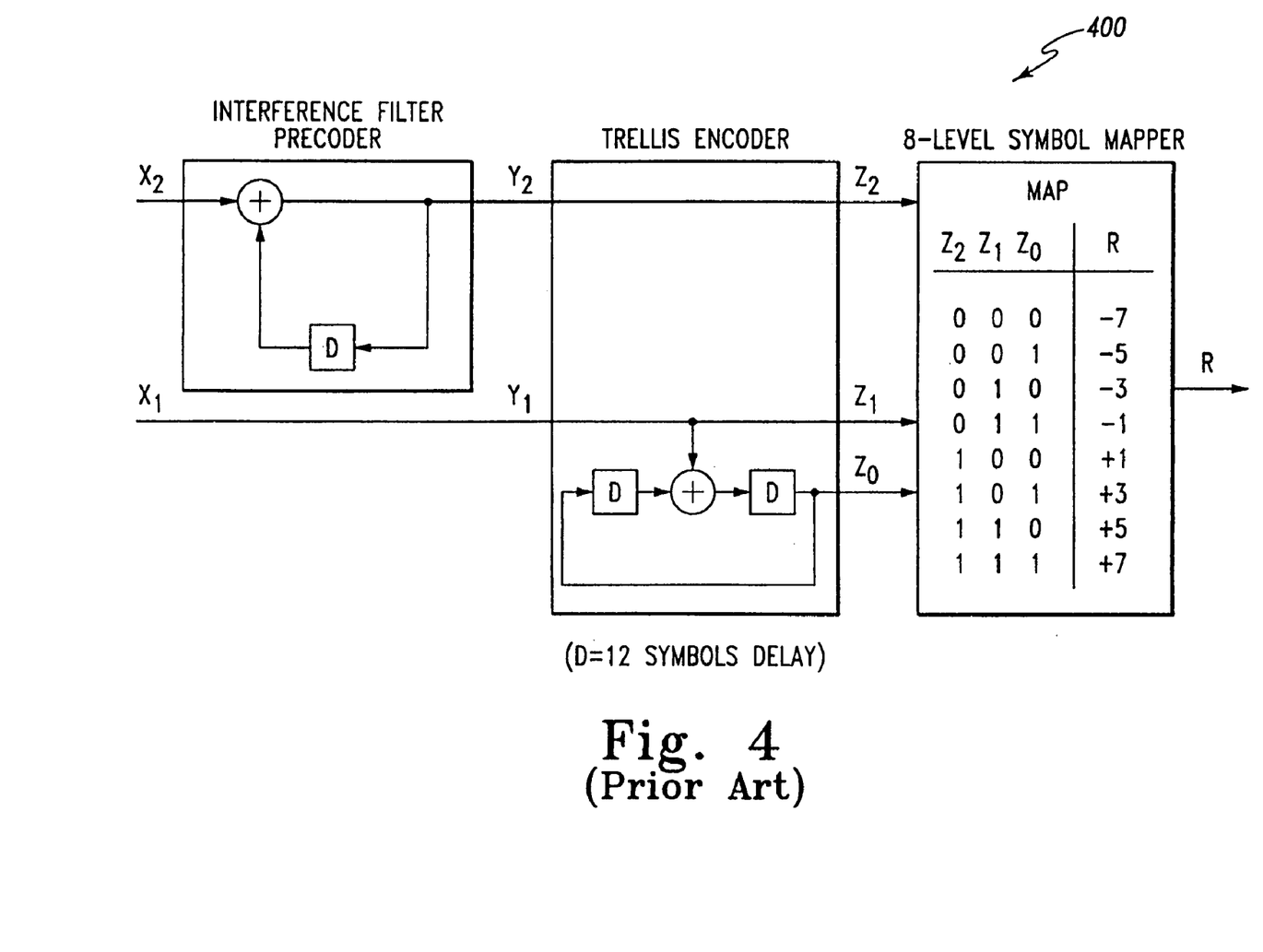
FIG. 4 illustrates of a prior art 8VSB trellis encoder, precoder, and symbol mapper.

FIG. 4 shows the further details of a trellis encoder, shown generally at 400, suitable for use with the decision feedback equalizer 224 shown in FIG. 3. The trellis encoder 400 is the 8VSB trellis encoder, precoder, and symbol mapper. As will be known by those skilled in the art, the 8VSB trellis encoder 400 uses an 8-level, 3-bit, one dimensional constellation. As can be seen from FIG. 4, the 8VSB trellis encoder 400 uses a ⅔ rate trellis code.

Typically, the trellis decoder 350 uses a Viterbi algorithm to decode the signal encoded by the 8VSB trellis encoder 400. Typically, the trellis decoder 350 has a large number of stages—most often 16 or 24. The decoded output 229 is deinterleaved by the de-interleaver 140 (FIG. 1), and then sent to the outer decoder 150 (FIG. 1).

Figure 5:
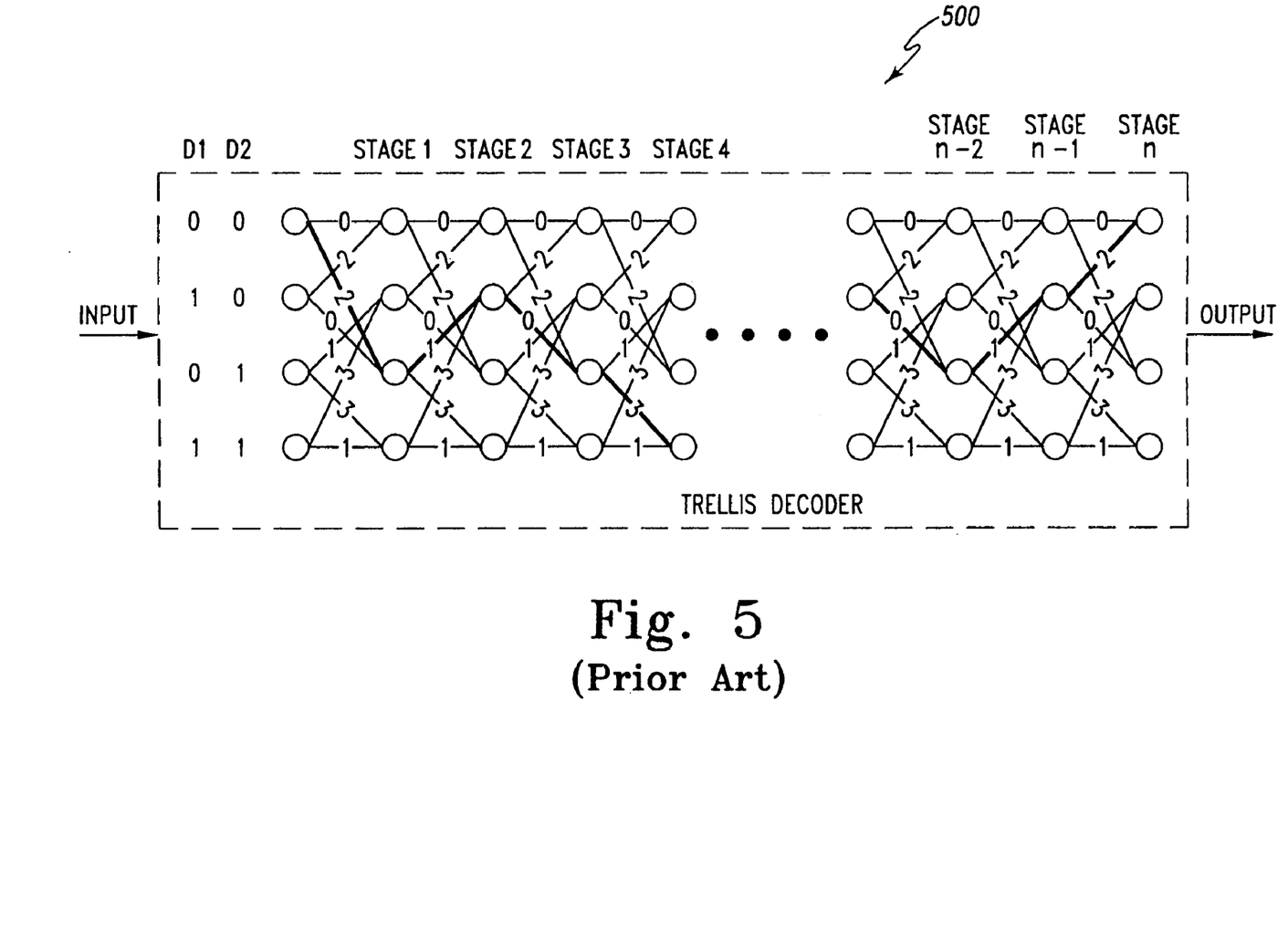
FIG. 5 is a prior art trellis diagram.

FIG. 5 shows a typical trellis diagram for an 8VSB trellis code with n stages, shown generally at 500. The heavier line illustrates a current survive path. At each decoding clock cycle a new symbol is sent to the trellis decoder and the survive path is renewed. It will be appreciated that in a VSB system each sample contains one symbol, while in QAM or offset-QAM systems, each sample contains two symbols—one in the I channel, the other in the Q channel. However, regardless of the sample size, the coding and decoding is always performed symbol by symbol. At each stage a decision is made about which state is the most likely (i.e., which symbol was most likely transmitted), based on the survive path. For example, stage 1 gives the first estimation to the input, and stage 2 gives the second estimation to the input, etc. It will be appreciated that the survive path may change based on the decoding process as each new input symbol is received, so that the survive path may not be the same (though shifted one symbol) from one input sample time to another.

Figure 6:
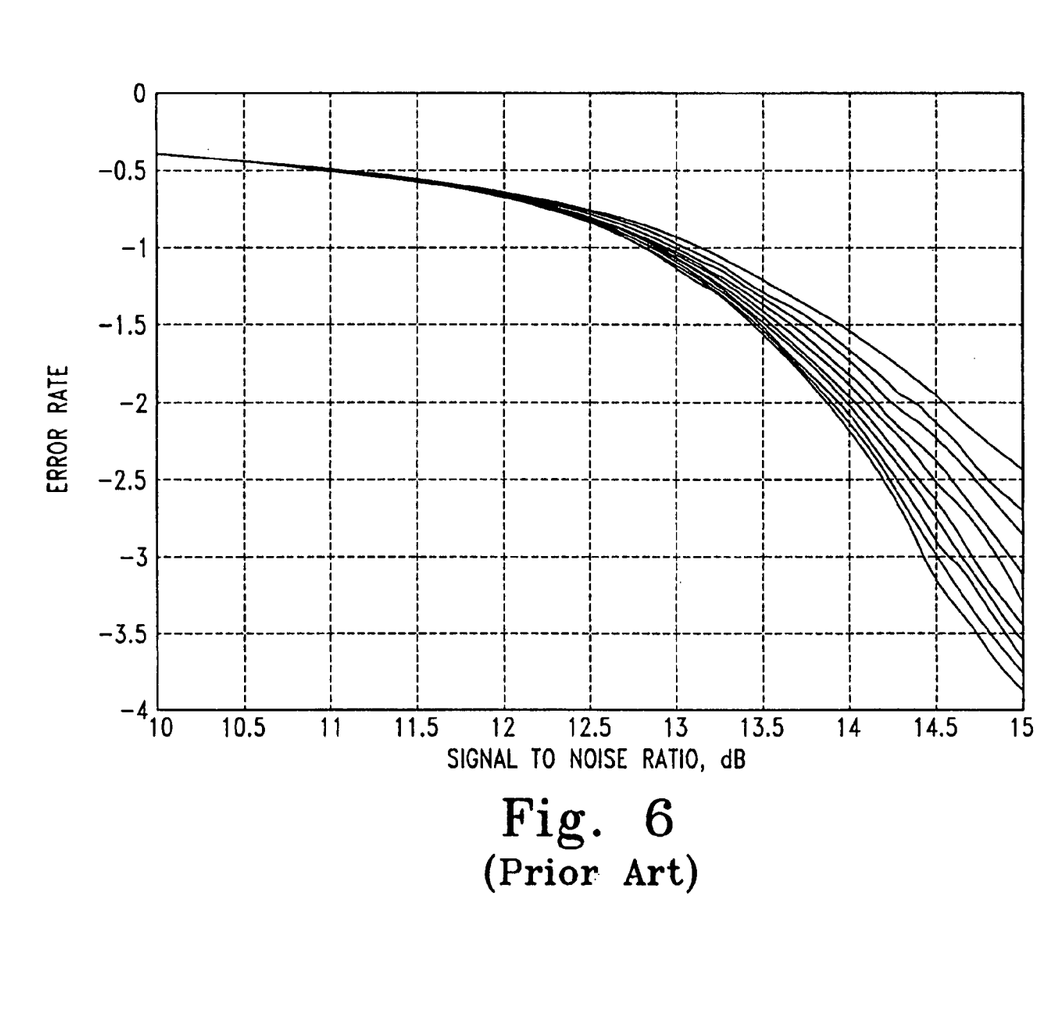
FIG. 6 is a graph showing the relationship between error rate and signal-to-noise ratio.

FIG. 6 shows the decoding error rate using a typical trellis decoder with the Viterbi decoding algorithm. As can be seen from the graph, when the system is running below the threshold, and even slightly above it, the error rate is lower after decoding, and the greater the decoding stage, the lower the error rate. The graph also shows that the early decoding stages have a higher gain than the later ones.

Figure 7:
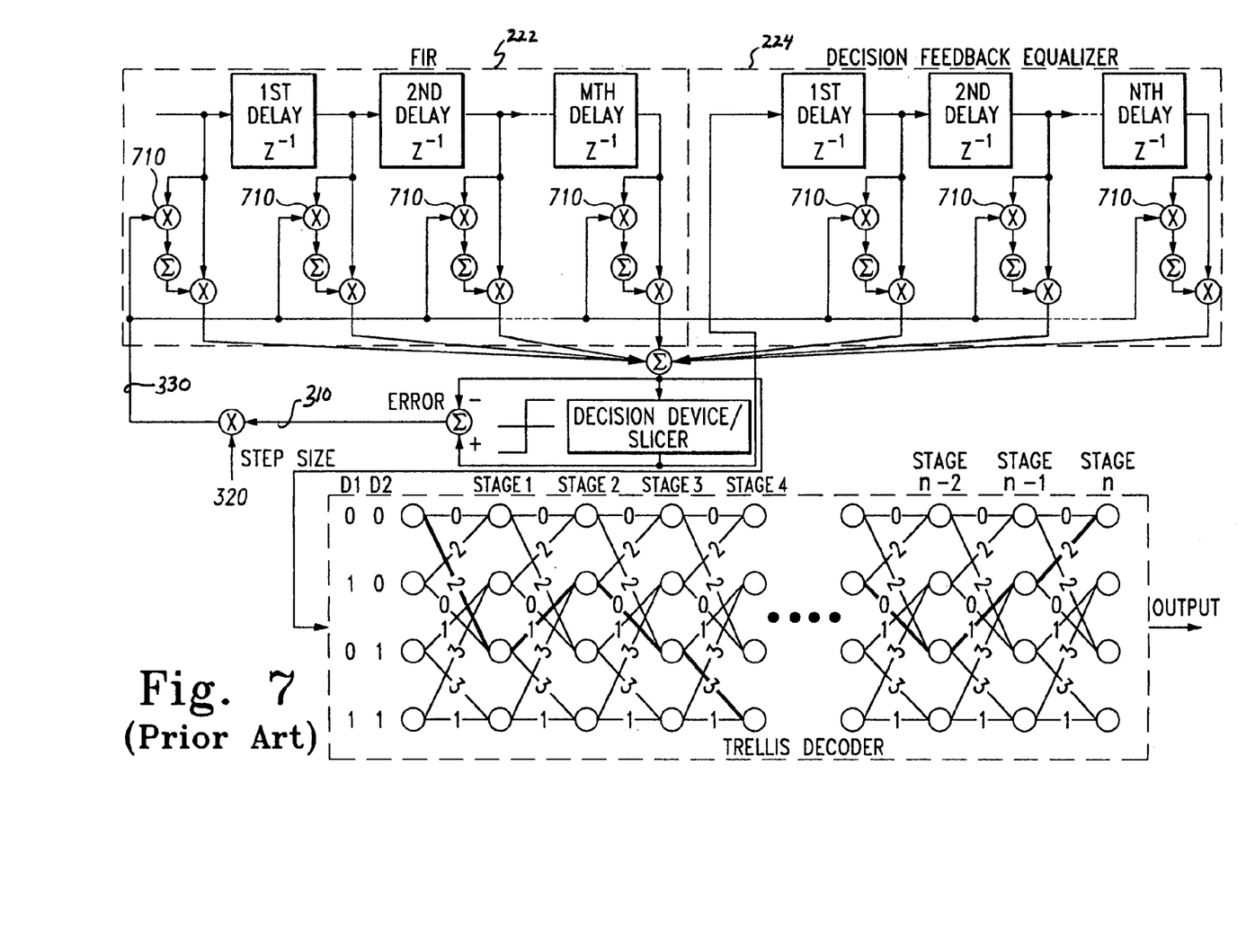
FIG. 7 is a diagram of the prior art decision feedback equalizer of FIG. 3, showing a trellis diagram having n stages.

FIG. 7 shows additional details of the equalizer 120. The error signal 310 is taken simply by subtracting a slicer output from a slicer input, then multiplying by the step size 320. The stepped error signal 330 is then multiplied by the input to the FIR filter 222 and DFE 224, and the results sent to accumulators 710 to update the equalizer taps. This error signal only captures the variation between the input signal and the sliced data level. Whenever the sliced data level does not correspond to the originally transmitted data level, the error signal will incorrectly exclude the difference. For example, if a transmitted value of 3 is received as 4.2, the slicer will read the 4.2 as 5, with an error of −0.8. The correct error in this case is actually +1.2. The FIR filter 222 and DFE 224, which use the error signal to correct for channel distortion such as multipathing, will propagate that error.

Therefore, what is needed is an equalizer having a more accurate error signal. The present invention is directed towards meeting this need, as well as providing other advantages over prior equalizers.

SUMMARY OF THE INVENTION

A first embodiment adaptive equalizer has an error signal that is generated by subtracting the output of a trellis decoder from the input to a trellis decoder.

A second embodiment adaptive equalizer comprises: an FIR filter; a trellis decoder coupled to the FIR filter; a mapper coupled to the trellis decoder; and a decision feedback equalizer coupled to the mapper. The decision feedback equalizer receives the mapped and scaled output of the trellis decoder as input. An error signal is generated by subtracting an output of the trellis decoder from the input to the trellis decoder.

A third embodiment adaptive equalizer includes FIR filter; a trellis decoder coupled to the FIR filter; a mapper coupled to the trellis decoder; and a decision feedback equalizer coupled to the mapper. The decision feedback equalizer receives the mapped and scaled output of the trellis decoder as input. An error signal is generated by subtracting an output of the equalizer from the input to the trellis decoder.

A fourth embodiment adaptive equalizer has an error signal that is generated using only a trellis decoder, a mapper, and a decision feedback equalizer.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates. In particular, although the invention is discussed in terms of an 8VSB system, it is contemplated that the invention can be used with other types of modulation coding, including, for example, QAM and offset-QAM.

Figure 8:
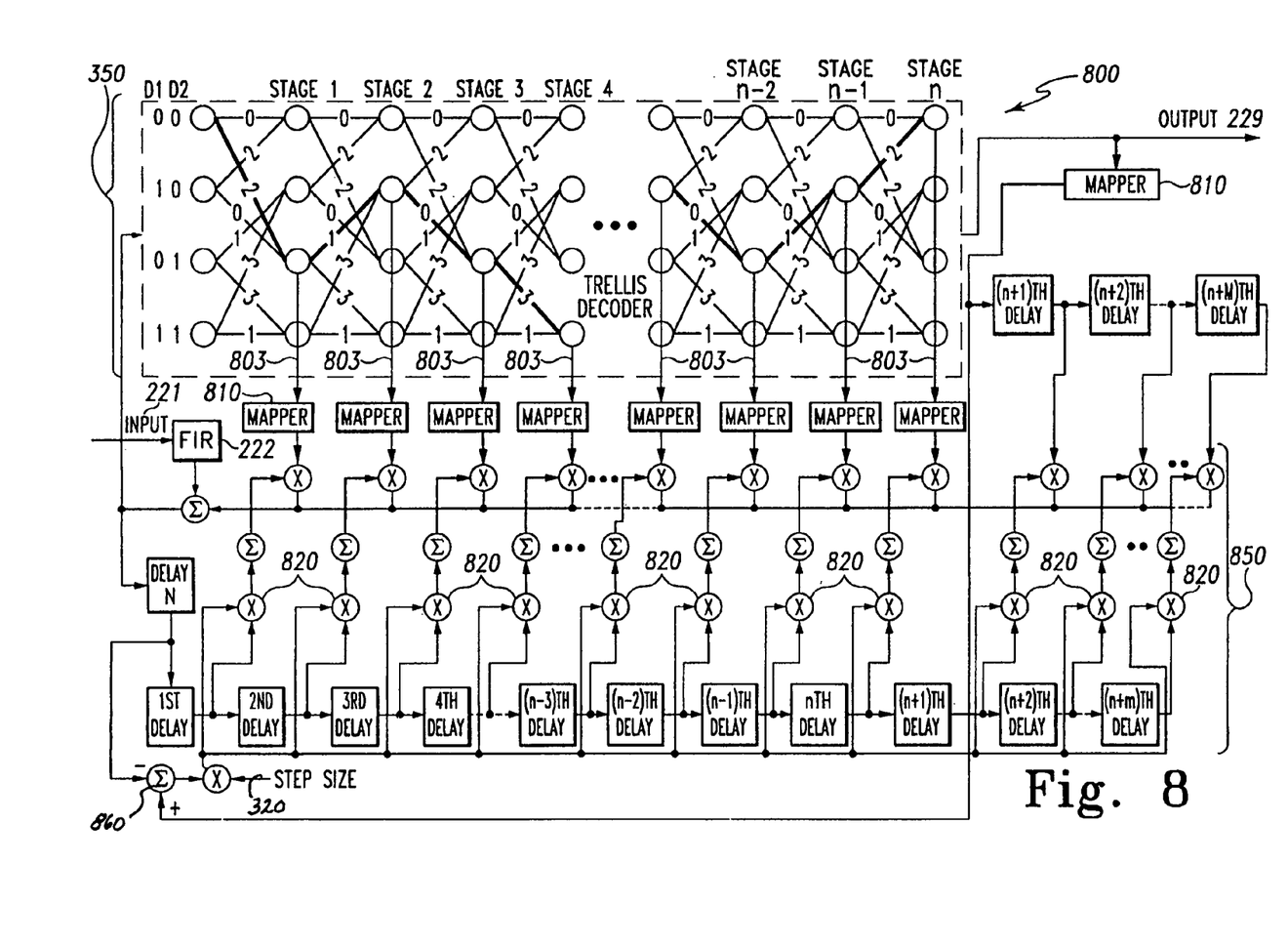
FIG. 8 is a diagram of a preferred embodiment equalizer according to the present invention.

FIG. 8 illustrates a preferred embodiment equalizer according to the present invention, indicated generally at 800, employing a decoding structure in which a decision feedback equalizer 850 receives its input from the trellis decoder 350. In certain preferred embodiments, the trellis decoder 350 uses a Viterbi algorithm, as is known in the art. Trellis decoder output 803 is input to the decision feedback equalizer 850 via a mapper 810. The mapper 810 maps and scales the trellis decoder's 350 output 803 back to signal levels. For example, in 8VSB the mapper 810 maps and scales the trellis decoder 350 output 803 back to normalized signal levels of ±1, ±3, ±5, and ±7. In certain embodiments the trellis decoder 350 has 16 stages and the decision feedback equalizer 850 has M taps. In these embodiments, from the 17th tap up to the Mth tap the decision feedback equalizer 850 has the same structure as a traditional decision feedback equalizer 224, except that the input to this section is the mapped and scaled output from the 16th stage of the trellis decoder. From the 1st tap to the 16th tap the inputs to the DFE 850 are the mapped and scaled version of the output 803 from the 1st to 16th stages of the trellis decoder 350, respectively. As can be seen from FIG. 8, for each input symbol there is a survive path (highlighted as a heavier line in FIG. 8). The inputs to the DFE 850 from stage 1 to stage 16 are the mapped and scaled decoded output on the survive path.

In certain other embodiments the trellis decoder 350 has some other number of stages "n," and the DFE 850 has M taps. In these embodiments, the decision feedback equalizer 850 has the same structure from the (n+1)th tap up to the Mth tap, and from the 1st tap to the nth tap the inputs to the DFE 850 are the mapped and scaled output from the trellis decoder 350 from the 1st to the nth stage, respectively.

It will be appreciated that the current survive path can change based on the decoding process with each new input symbol, so the survive path may not be the same (though shifted one symbol) from one sample time to the next. Thus, all the inputs to the DFE 850 can vary from symbol to symbol. This is different from prior art DFEs 224, in which the input to the next stage in the equalizer 224 is the delayed symbol from the previous stage.

The equalizer taps are generated as shown in FIG. 8. The raw error signal from the summer 860 is taken by subtracting a delayed version of the input to the trellis decoder 350 from the mapped and scaled version of the output 229 of the trellis decoder 350. The raw error signal is then multiplied by the step size 320. The result is then multiplied by the same input to the trellis decoder that was supplied to the summer 860 (to be subtracted from the mapped and scaled output 229) to generate the corrected error signal. Note that this input to the trellis decoder must be delayed again by the same number of cycles it takes for the error signal generated by the summer 860 to be multiplied by the step size 320. The result is then sent to accumulators 820 to update the equalizer taps.

It will be appreciated that the error signal in an equalizer according to the present invention is generated with a short delay. If the error signal is generated after 16 decoding stages in a 8VSB system, for example, the delay is 192 symbols, due to the 12 parallel encoders used by the 8VSB system. With a symbol rate of 10.76 MHz the delay is about 17.8 µs. Compared with a maximum channel distortion varying rate of about 200 Hz, or 5 ms, the delay in generating the error signal is very short. Thus, the delay in error signal generation will not substantially harm convergence due to the varying channel distortion.

However, the present invention can be used even if the number of parallel encoders and decoders is sufficiently large so that the total delay is long enough to potentially harm the tracking of varying channel distortion. In these situations the error signal can be generated at earlier decoding stages. The earlier stages have a higher error rate than the last decoding stage, so this is preferable only when necessary to reduce the delay in error signal generation. However, even the earlier decoding stages have a significant gain. Therefore, the result will still be a substantially improved decoding gain over a system in which, for example, the input to the trellis decoder is a sliced signal.

Those skilled in the art will appreciate that a preferred embodiment equalizer as shown in FIG. 8 has advantages over prior art equalizers. The input to the decision feedback equalizer has fewer errors, because it is taken from the mapped and scaled output of the trellis decoder. The lower error rate in the trellis decoder's input makes the equalizer more stable, and causes it to converge more rapidly. Also, the lower error rate in the trellis decoder's input results in a much lower error rate in its output, resulting in a better equalized signal. Furthermore, the equalizer more effectively eliminates long post-ghosts because there is increasing gain from the trellis decoder from stage to stage. There is significant gain starting from the first trellis decoding stage, so that the decision feedback equalizer is benefited from the start. Also, since the trellis decoded output is more reliable and accurate, the input to the decision feedback equalizer can have fewer bits. This permits a reduction in hardware complexity.

It will further be appreciated that these advantages can be achieved without the use of additional hardware, except for a delay line for generating error signals from the decoder output. A standard trellis decoder employing a standard Viterbi algorithm can be used.

Figure 9:
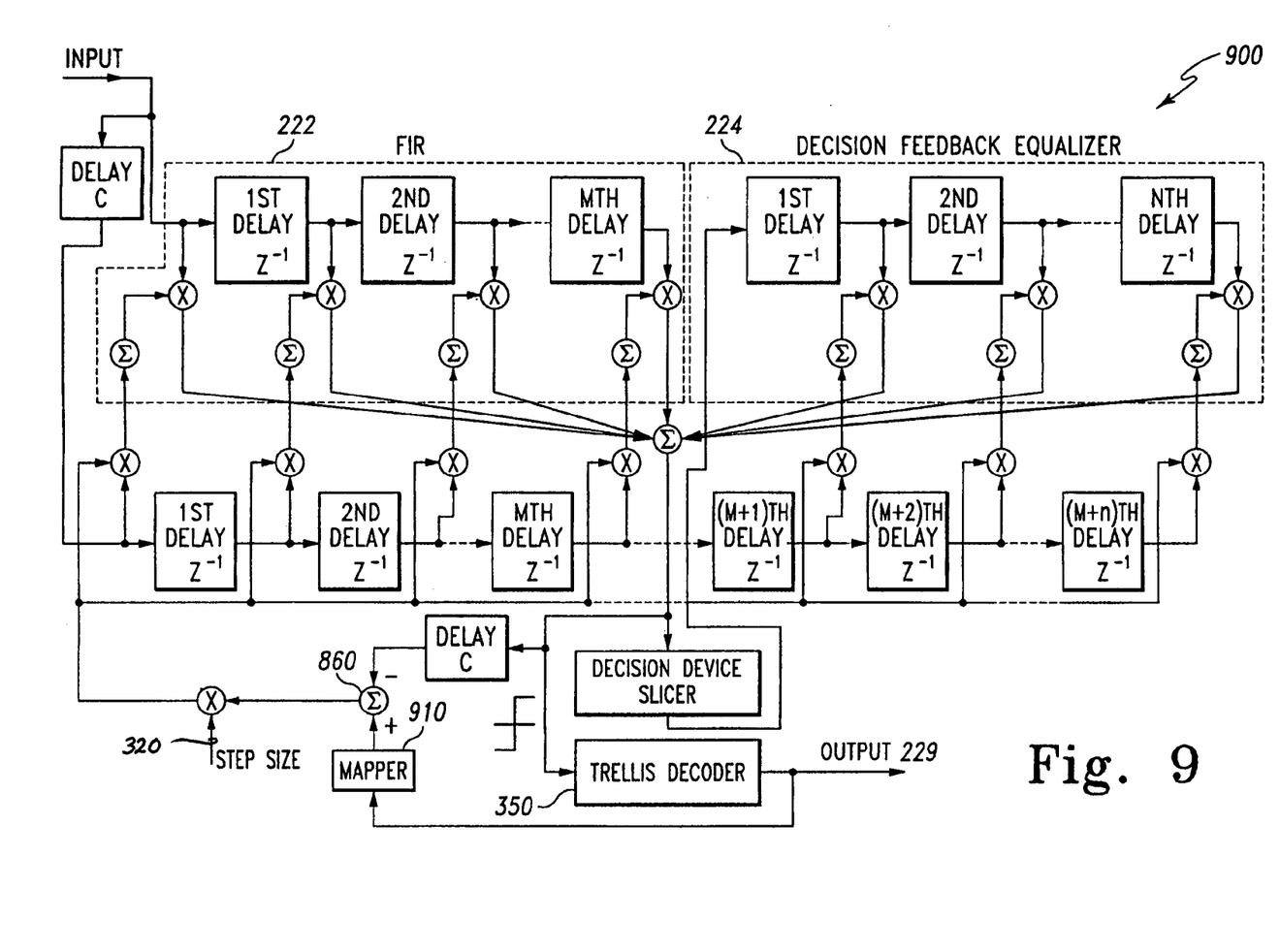
FIG. 9 is an alternative embodiment equalizer in which the decision feedback equalizer uses sliced data for its input.

FIG. 9 illustrates an alternative embodiment equalizer, shown generally at 900, in which the decision feedback equalizer 224 uses sliced data for its input. The summer 860 generates the error signal by subtracting a delayed version of the slicer input from the trellis decoder output 229. Preferably the trellis decoder output 229 is mapped and scaled back to corresponding data levels with a mapper 910 before it is used to generate the error signal. The slicer input is delayed by a number of cycles equal to the number of cycles the trellis decoder 350 uses to generate the output 229. The error signal from the summer 860 is then multiplied by the step size 320 before it is used to update the tap coefficients of the FIR filter 222 and the DFE 224.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An adaptive equalizer for generating an error signal, the adaptive equalizer comprising:
   a summer that receives an input signal and a decision feedback equalizer output signal and provides a difference signal indicative thereof;
   a trellis decoder that receives and decodes the difference signal to provide a decoded output signal;
   a mapper, which receives the decoded output signal and maps and scales the decoded output signal to provide a mapped and scaled output signal; and
   a decision feedback equalizer that receives the mapped and scaled output signal and the difference signal and generates a raw error signal indicative of the difference, and processes (i) the mapped and scaled output signal, (ii) the difference signal and (iii) the raw error signal to provide the decision feedback equalizer output signal.

2. An adaptive equalizer comprising:
   a FIR filter having a FIR filter output;
   a trellis decoder having a trellis decoder input coupled to the FIR filter output;
   a mapper coupled to the trellis decoder, having a mapper input, a first mapped and scaled output and a second mapped and scaled output, the mapper being coupled to the trellis decoder output; and
   a decision feedback equalizer having a DFE input and a DFE output, wherein the DFE input is coupled to the first mapped and scaled output;
   wherein an error signal is generated by subtracting the trellis decoder input from the second mapped and scaled output.

3. An adaptive equalizer, comprising:
   a summer that receives an input signal and an equalizing data signal, and provides a difference signal indicative thereof;
   a trellis decoder that receives the difference signal and provides a decoded output signal;
   a mapper that receives the decoded output signal, and maps and scales the decoded output signal to provide a mapped and scaled output signal; and
   a decision feedback equalizer that receives and processes (i) the mapped and scaled output signal and (ii) the difference signal to provide the equalizing data signal.

4. The adaptive equalizer of claim 3, wherein the trellis decoder comprises a Viterbi decoder.

5. The adaptive equalizer of claim 1, comprising:
   a filter that receives and filters a signal to provide the input signal.

6. The adaptive equalizer of claim 1, wherein the trellis decoder comprises a Viterbi decoder.

7. The adaptive equalizer of claim 1, wherein the adaptive equalizer is configured and arranged to process 8VSB signals.

8. The adaptive equalizer of claim 1, wherein the adaptive equalizer is configured and arranged to process quadrature amplitude modulation (QAM) signals.

9. The adaptive equalizer of claim 1, wherein the adaptive equalizer is configured and arranged to process offset quadrature amplitude modulation (QAM) signals.

10. The adaptive equalizer of claim 7, wherein the trellis decoder comprises at least sixteen stages.

11. The adaptive equalizer of claim 2, wherein the adaptive equalizer is configured and arranged to process 8VSB signals, and the trellis decoder comprises at least sixteen stages.

12. The adaptive equalizer of claim 11, wherein the decision feedback, equalizer also receives the error signal and processes the first mapped and scaled output and the error signal to generate the DFE output, and the trellis decoder comprises a Viterbi detector.

13. The adaptive equalizer of claim 3, comprising:
   a filter that receives and filters a signal to provide the input signal.

14. The adaptive equalizer of claim 13, wherein the input signal is a vestigial sideband encoded signal, and the trellis decoder comprises at least sixteen stages.

15. An adaptive equalizer comprising:
   a trellis decoder having a trellis decoder input and a trellis decoder output;
   a mapper coupled to the trellis decoder output, having a mapper input, a first mapped and scaled output and a second mapped and scaled output; and
   a decision feedback equalizer having a DFE input and a DFE output, wherein the DFE input is coupled to the first mapped and scaled output;

wherein an error signal is generated by subtracting the trellis decoder input from the second mapped and scaled output.

16. The adaptive equalizer of claim 15, wherein the decision feedback equalizer also receives the error signal and processes the first mapped and scaled output and the error signal to generate the DFE output.

17. The adaptive equalizer of claim 16, wherein the trellis decoder comprises a Viterbi detector.

18. The adaptive equalizer of claim 16, wherein the adaptive equalizer is configured and arranged to process an amplitude modulated signal.

* * * * *

UNITED STATES PATENT AND TRADEMARK OFFICE
CERTIFICATE OF CORRECTION

PATENT NO.       : 7,190,744 B2
APPLICATION NO.  : 09/876547
DATED            : March 13, 2007
INVENTOR(S)      : Xia et al.

It is certified that error appears in the above-identified patent and that said Letters Patent is hereby corrected as shown below:

Column 5
Line 14, before "FIR", insert --a--

Column 8
Line 49, delete "feedback," and insert --feedback--

Signed and Sealed this

Eighteenth Day of March, 2008

JON W. DUDAS
*Director of the United States Patent and Trademark Office*